US009827861B2

(12) United States Patent
Gale et al.

(10) Patent No.: US 9,827,861 B2
(45) Date of Patent: Nov. 28, 2017

(54) SYSTEM AND METHOD FOR VEHICLE BATTERY CHARGING

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 12/940,274

(22) Filed: Nov. 5, 2010

(65) Prior Publication Data

US 2011/0163717 A1    Jul. 7, 2011

(51) Int. Cl.
*H02J 7/14* (2006.01)
*B60L 11/18* (2006.01)

(52) U.S. Cl.
CPC ....... *B60L 11/1816* (2013.01); *Y02T 10/7005* (2013.01); *Y02T 10/7072* (2013.01); *Y02T 90/14* (2013.01)

(58) Field of Classification Search
CPC ............. B60L 11/1816; Y02T 10/7072; Y02T 10/7005
USPC ........................................................ 320/109
See application file for complete search history.

(56) References Cited

U.S. PATENT DOCUMENTS

| | | | |
|---|---|---|---|
| 6,664,762 B2 * | 12/2003 | Kutkut | 320/116 |
| 7,203,048 B2 | 4/2007 | Shyr et al. | |
| 7,365,515 B2 | 4/2008 | Takano et al. | |
| 7,497,285 B1 * | 3/2009 | Radev | 180/65.225 |
| 2009/0243547 A1 * | 10/2009 | Andelfinger | 320/139 |
| 2010/0038962 A1 * | 2/2010 | Komatsu | 307/10.1 |
| 2010/0127665 A1 * | 5/2010 | Mitsutani | 320/137 |
| 2010/0270980 A1 * | 10/2010 | Newhouse et al. | 320/152 |

FOREIGN PATENT DOCUMENTS

| | | | |
|---|---|---|---|
| JP | 55119368 | A | 9/1980 |
| JP | 5276690 | A | 10/1993 |
| JP | 6014474 | A | 1/1994 |

* cited by examiner

*Primary Examiner* — Nathaniel Pelton
*Assistant Examiner* — Johali Torres Ruiz
(74) *Attorney, Agent, or Firm* — David B. Kelley; Brooks Kushman P.C.

(57) ABSTRACT

A vehicle power system includes a traction battery and a battery charger. The battery charger has an electrical output and a capacitor electrically connected with the electrical output. No more than two electrical contactors are electrically connected with the traction battery, capacitor and battery charger.

3 Claims, 3 Drawing Sheets

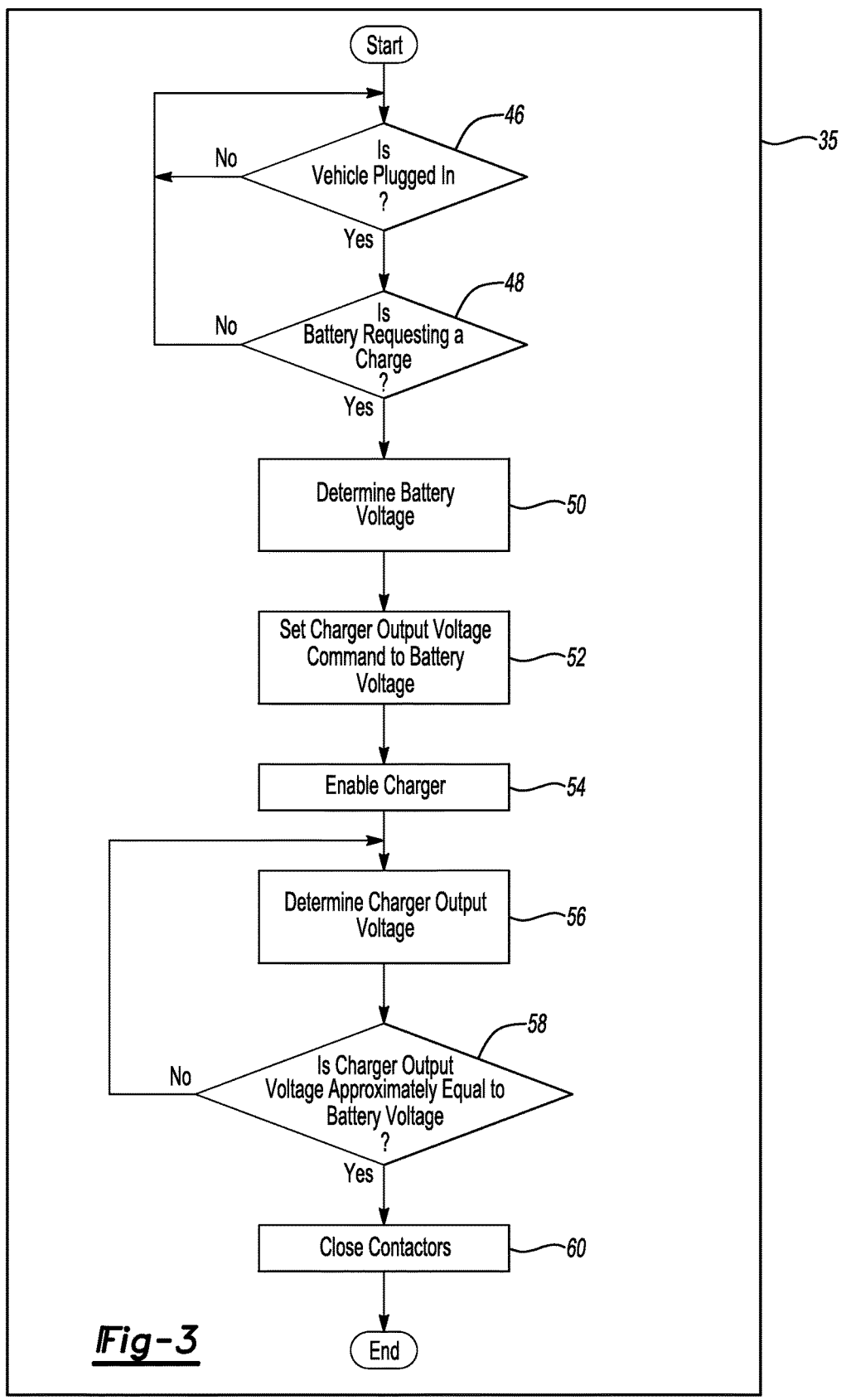

SYSTEM AND METHOD FOR VEHICLE BATTERY CHARGING

BACKGROUND

Plug-in hybrid electric vehicles and battery electric vehicles typically include a battery charger that may receive electrical energy from an electrical grid via a wall outlet and provide electrical energy to a traction battery and/or other electrical loads.

SUMMARY

A vehicle power system may include a traction battery and a battery charger. The battery charger may include a power converter having an electrical output and an electrical input configured to be electrically connected with an electrical power source remote from the vehicle. The battery charger may also include a capacitor electrically connected with the electrical output. The vehicle power system may further include no more than two electrical contactors electrically connected with the traction battery, capacitor and power converter A method for charging a traction battery of a vehicle may include determining a voltage of the traction battery, commanding an output voltage from a battery charger equal to the voltage of the traction battery, and determining whether the output voltage of the battery charger is approximately equal to the voltage of the traction battery. The method may further include closing contactors electrically connected with the traction battery and battery charger if the output voltage of the battery charger is approximately equal to the voltage of the traction battery.

A vehicle may include a traction battery and a battery charger including an output and a capacitor electrically connected with the output. The vehicle may further include a wiring system connecting the traction battery and the output of the battery charger. The wiring system includes no more than two electrical contactors.

BRIEF DESCRIPTION OF THE DRAWINGS

FIG. 3 is a flow chart depicting an algorithm for controlling current flow through the vehicle power system of FIG. 2.

DETAILED DESCRIPTION

Figure 1:
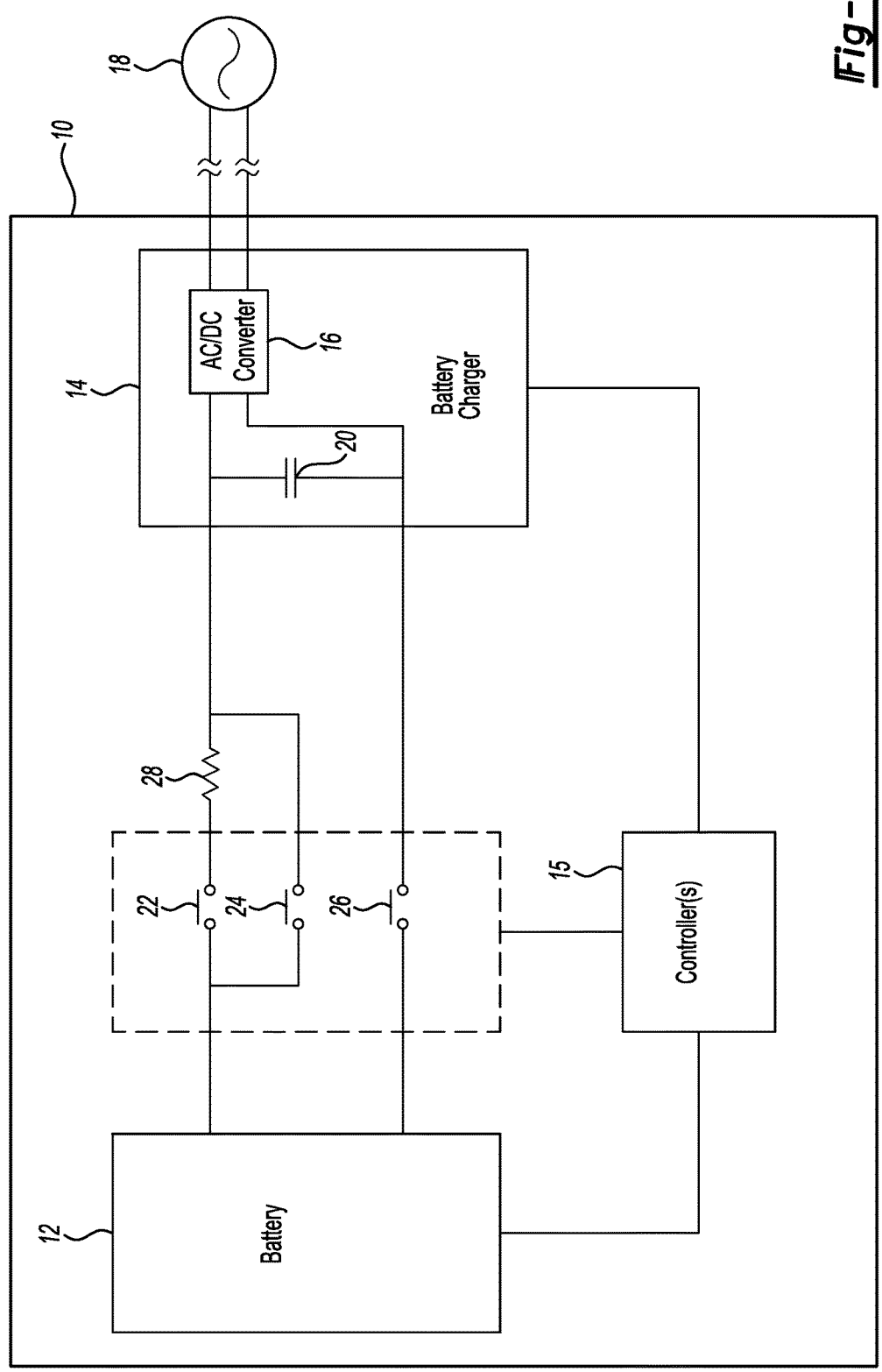
FIG. 1 is a block diagram of a vehicle power system.

Referring to FIG. 1, an alternatively powered vehicle 10 (e.g., plug-in hybrid electric vehicle, battery electric vehicle, etc.) includes a traction battery 12, battery charger 14 and one or more controllers 15. The traction battery 12, as known in the art, is configured to provide energy to and/or receive energy from an electric machine (not shown) arranged to generate motive power for the vehicle 10. The battery charger 14 includes an AC/DC converter 16 whose input may be electrically connected with an electrical grid (or other electrical source) 18 via, for example, a wall outlet. That is, the vehicle 10 may be plugged into an electrical outlet. AC electrical power may then flow from the electrical grid 18 to the AC/DC converter 16 under the command of the controllers 15. A capacitor 20 spans the output of the AC/DC converter 16 to filter the DC power output by the AC/DC converter 16.

The output of the AC/DC converter 16 may be electrically connected with the traction battery 12 via contactors 22, 24, 26. The electrical line including the contactor 22 also includes a series resistor 28. To electrically connect the AC/DC converter 16 with the traction battery 12, the controllers 15 may first close the contactors 22, 26 to limit current flow through the contactors 22, 26 and capacitor 20 via the resistor 28. Once closed, the current flow through the contactors 22, 26, $I_{contactor}$ is substantially defined by $$I_{contactor} = \frac{V_{bat} - V_c}{R_{28} + R_{bat} + R_{wire}} \quad (1)$$

where $V_{bat}$ is the voltage at the output terminals of the traction battery 12, $V_c$ is the voltage across the capacitor 20, $R_{28}$ is the resistance of the resistor 28, $R_{bat}$ is the internal resistance of the traction battery 12, and $R_{wire}$ is the resistance of the wires connecting the traction battery 12 to the capacitor 20. ($R_{28}$, in this example, is much larger than $R_{bat}$ and $R_{wire}$, and can be sized to limit the current to a desired level less than the design limit of the contactors 22, 26.)

After the voltage difference, $V_{bat}-V_c$, falls to a predefined (low) value, $R_{28}$ can be effectively removed from the circuit by closing the contactor 24, reducing (1) as follows $$I_{contactor} = \frac{V_{bat} - V_c}{R_{bat} + R_{wire}} \quad (2)$$

Thus, the closure voltage for the contactor 24 can be selected from (2) considering a desired maximum current, $I_{contactor}$, based on a selected closing voltage differential, $V_{bat}-V_c$. For example, if the value of $R_{bat}+R_{wire}$ is 0.2Ω and the maximum desired closing current is 10 A or less, than the differential voltage, $V_{bat}-V_c$, would be 2 V.

As apparent to those in the art, the vehicle power system of FIG. 1 includes three (3) contactors (i.e., the contactors 22, 24, 26). Generally speaking however, cost, weight and complexity increases as the number of contactors increases.

Figure 2:
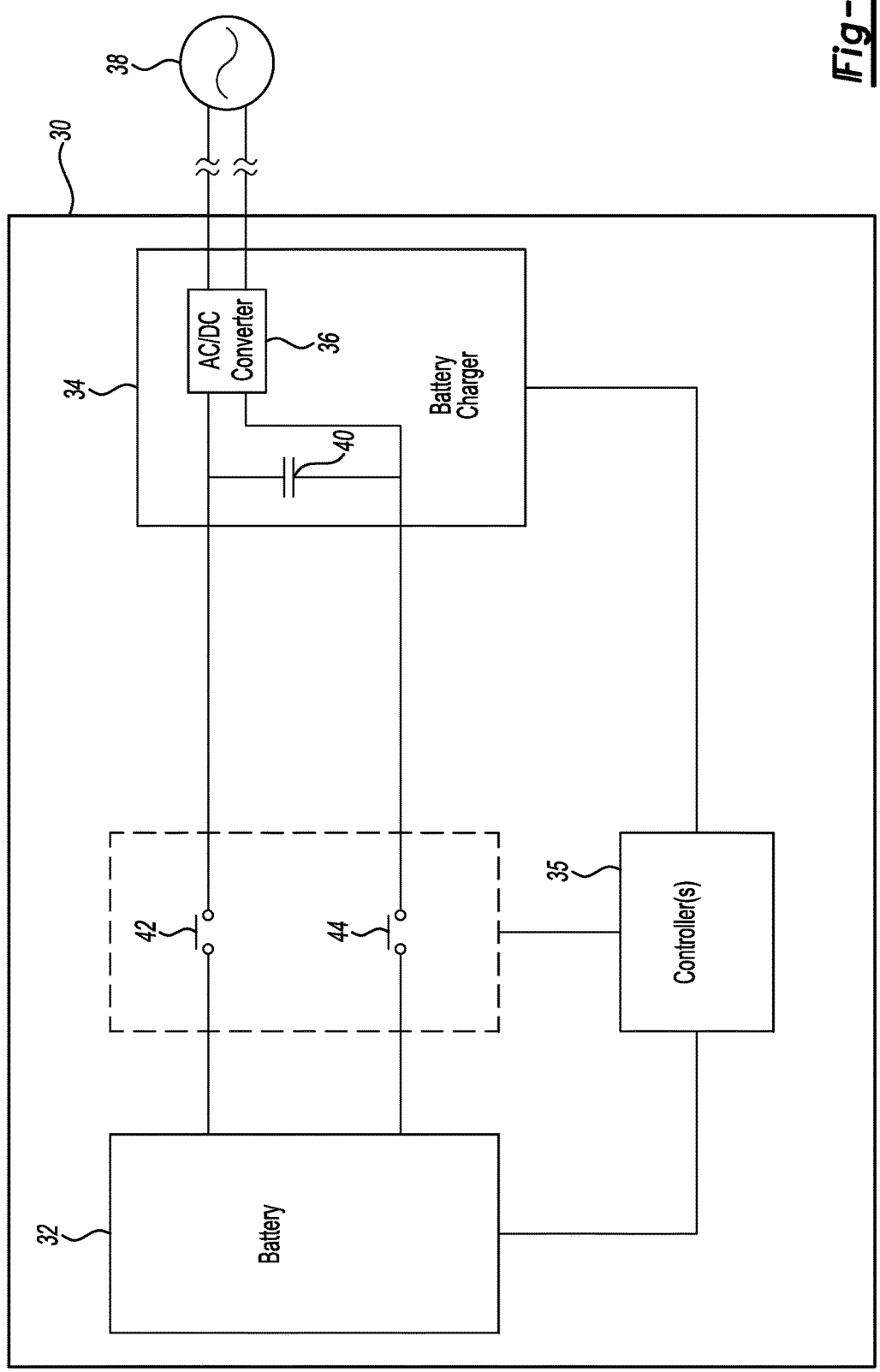
FIG. 2 is a block diagram of another vehicle power system.

Referring to FIG. 2, an alternatively powered vehicle 30 (e.g., plug-in hybrid electric vehicle, battery electric vehicle, etc.) includes a traction battery 32, battery charger 34 and one or more controllers 35. The traction battery 32, as known in the art, is configured to provide energy to and/or receive energy from an electric machine (not shown) arranged to generate motive power for the vehicle 30. The battery charger 34 includes an AC/DC converter 36 whose input may be electrically connected with an electrical grid (or other electrical source) 38 via, for example, a wall outlet. That is, the vehicle 30 may be plugged into an electrical outlet. AC electrical power may then flow from the electrical grid 38 to the AC/DC converter 36 under the command of the controllers 35. A capacitor 40 spans the output of the AC/DC converter 36 to filter the DC power output by the AC/DC converter 36.

The output of the AC/DC converter 36 may be electrically connected with the traction battery 32 via contactors 42, 44 (and associated wiring). That is, each of the high side and low side electrical connections include a single contactor. This reduced number of contactors, relative to the arrangement of FIG. 1, may reduce the cost, weight and complexity associated with the power system design of FIG. 2.

Referring to FIGS. 2 and 3, the controllers 35 may determine whether the vehicle 30 is plugged in at operation 46 in any suitable/known fashion. If no, the algorithm returns to operation 46. If yes, the controllers 35 may determine whether the traction battery 32 is requesting a charge at operation 48 in any suitable/known fashion. If no, the algorithm returns to operation 46. If yes, the controllers 35 may determine (e.g., read, measure, etc.) the voltage of the traction battery 32 at operation 50. At operation 52, the controllers 35 may set the output voltage command for the battery charger 34 equal to the voltage of the traction battery 32 determined at operation 50. For example, if the traction battery voltage is 300 V, the controllers 35 may set the output voltage command for the battery charger 34 equal to 300 V (at a maximum current of 0.1 A). At operation 54, the controllers 35 may enable the battery charger 34. At operation 56, the controllers 35 may determine (e.g., read, measure, etc.) the output voltage of the battery charger 34. At operation 58, the controllers 35 may determine whether the battery charger output voltage is approximately equal to the traction battery voltage. If no, the algorithm returns to operation 56. If yes, the controllers 35 may then close the contactors 42, 44 at operation 60.

Because the contactors 42, 44 are not closed until the battery charger output voltage is approximately equal to the traction battery voltage, (2) can be satisfied for the condition concerning $V_{bat}-V_c$ described above. As noted in the prior example, the condition for closure may again be 2 V. Therefore, the battery charger output voltage need not be equal to the traction battery voltage. Rather, the battery charger output voltage may fall within a range of voltages that includes the traction battery voltage. This range may be determined via testing, simulation, etc. based on the current rating of the contactors 42, 44.

The algorithms disclosed herein may be deliverable to/implemented by a processing device, such as the battery charger 34 or controllers 35, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A vehicle power system comprising:
   a traction battery;
   a battery charger including an output, an input configured to be electrically connected with an electrical power source remote from the vehicle, and a capacitor electrically connected across the output;
   no more than two electrical contactors configured to connect the traction battery to the output to enable current flow from the battery charger to the traction battery; and
   a controller configured to command, while the contactors are open, an output voltage of the battery charger to be approximately equal to a detected voltage of the traction battery and to close the contactors in response to the output voltage being approximately equal to the detected voltage of the traction battery.

2. A method for charging a traction battery of a vehicle comprising:
   commanding an output voltage of a battery charger to be equal to a detected voltage of the traction battery; and
   closing no more than two contactors electrically connected with the traction battery and battery charger in response to the output voltage of the battery charger being approximately equal to the detected voltage to enable current flow from the battery charger to the traction battery.

3. A vehicle comprising:
   a traction battery;
   a battery charger including an output and a capacitor electrically connected across the output;
   a wiring system connecting the traction battery and the output of the battery charger, the wiring system including no more than two electrical contactors configured to connect the traction battery to the battery charger to enable current flow from the battery charger to the traction battery; and
   a controller configured to command, while the contactors are open, an output voltage of the battery charger to be approximately equal to a detected voltage of the traction battery and to close the contactors in response to the output voltage being approximately equal to the detected voltage of the traction battery.

* * * * *